March 24, 1953  F. P. VANCE, JR  2,632,314
FRACTIONAL FUSION APPARATUS

Filed Sept. 22, 1949  2 SHEETS—SHEET 1

INVENTOR.
F. P. VANCE, JR
BY Hudson & Young
ATTORNEYS

Patented Mar. 24, 1953

2,632,314

UNITED STATES PATENT OFFICE 2,632,314

FRACTIONAL FUSION APPARATUS

Frank P. Vance, Jr., Bartlesville, Okla., assignor to Phillips Petroleum Company, a corporation of Delaware Application September 22, 1949, Serial No. 117,248

10 Claims. (Cl. 62—124)

This invention relates to the separation of mixtures by fractional fusion. In one aspect it relates to the separation of mixtures of compounds which are not decomposed by melting. In another aspect, it relates to an apparatus for separating mixtures of compounds into their components. In still another aspect, it relates to an apparatus for purifying impure compounds which are not decomposed by melting.

In the preparation of pure compounds and particularly organic compounds, the desired one usually occurs as one component of a mixture. Various methods are used for resolving such mixtures into their components. Among these methods are those which take advantage of differences in the physical properties of the components, such as distillation, extraction, and fractional crystallization. The usual fractional crystallization process involves a plurality of crystallization steps which must be carried out in separate containers. In such processes, it is impossible to crystallize in each step all of the desired component. That amount which is crystallized in each step contains a certain amount of its mother liquor as impurity. Because of its inefficiency and the number of complicated steps necessary, fractional crystallization, as a method of preparing pure compounds is used only as a last resort.

I have invented an apparatus for purifying an impure material by establishing intimate contact between the solid granular material in a solid granular state and a wash liquid of higher purity with respect to the higher-melting fraction or component of said solid material. My apparatus permits continuous contact between a solid granular material which is moved downward through the apparatus and a reflux liquid which is moved upward through the apparatus. In resolving a mixture of compounds into its components by using my apparatus, the entire feed is solidified and the lower-melting fraction or component is removed by melting a portion of the solid and removing the melt. This is possible because a pure compound has a higher melting point than the same compound in an impure state and a portion of a solid in contact with a liquid of the same components as the solid has a higher purity with respect to the higher-melting fraction of the mixture.

If the mixture to be separated forms a solid solution, the higher-melting fraction is the higher-melting component. If the mixture is eutectic-forming, the higher-melting fraction is richer with respect to the saturating component, which may or may not be the higher-melting component. In the latter case, the eutectic mixture is the lower-melting fraction. By a multistage process, solid solution-forming mixtures can be resolved into their pure components if the number of stages is sufficient. With a eutectic-forming mixture, one fraction is the saturating component in substantially pure form, while the other fraction is a mixture of the eutectic composition. A binary eutectic is a mixture of two components, each of which is saturated with respect to the other. If one component is not saturated, it is the saturating component and will crystallize first on cooling the liquid mixture.

It is an object of my invention to provide an apparatus for purifying impure compounds.

Another object is to provide an apparatus for resolving solid solutions into their components.

Another object is to provide an apparatus for resolving a mixture of compounds into a higher-melting fraction and a lower-melting fraction, at least one of which fractions is substantially pure.

Still another object is to provide a method for resolving impure mixtures of compounds into their pure components.

Other objects and advantages of my invention will be apparent from a study of the following drawing, description, and claims.

Figure 1:
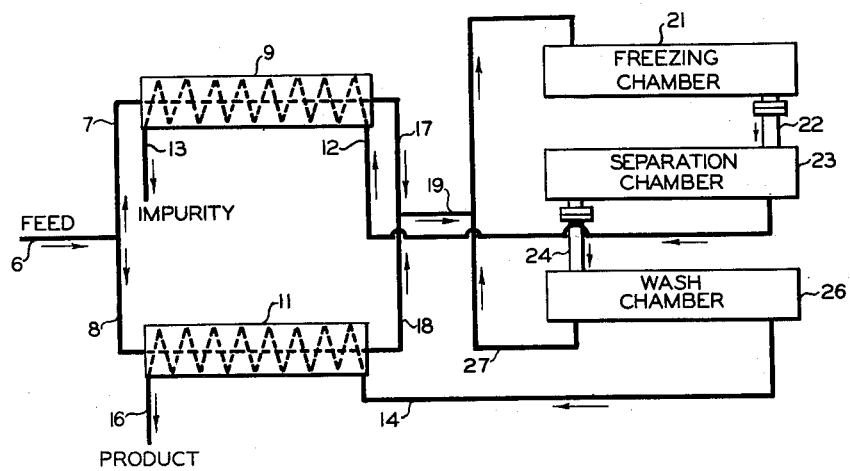
Figure 1 is a flow sheet showing the desired steps for efficient operation of my process.

In Figure 1, feed line 6 splits into two branches, 7 and 8. Branch 7 leads to heat exchanger 9 and branch 8 leads to heat exchanger 11. The refrigerant liquid enters exchanger 9 through line 12 and leaves through line 13, while the refrigerant for exchanger 11 enters through line 14 and leaves through line 16. Lines 17 and 18 from the exchanger 9 and 11 come together to form a single line 19 which enters one end of freezing chamber 21, which has a conduit connection 22 at its opposite end with separation chamber 23. Line 12 leads from the separation chamber at a point adjacent the inlet end to heat exchanger 9. At the opposite end of separation chamber 23, conduit 24 connects said chamber with wash chamber 26. Conduit 27 leads from said wash chamber 26 at a point adjacent the inlet of line 24 with line 19 which leads to freezing chamber 21. Line 14 leads from the opposite end of said wash chamber to the refrigerant inlet of heat exchanger 11.

Figure 2:
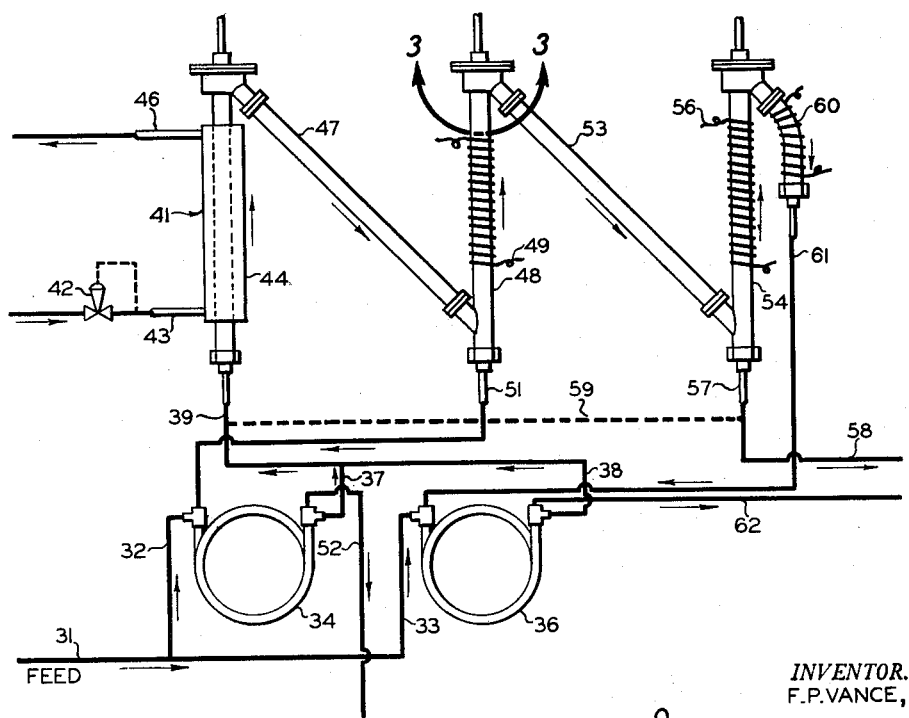
Figure 2 is an elevational view of my apparatus for effecting separation by fractional fusion.

In Figure 2, feed line 31 splits into branches 32 and 33, which lead to heat exchangers 34 and 36. The outlet lines 37 and 38 from exchangers 34 and 36 unite to form feed line 39 which leads to freezing chamber 41. A flow control valve 42 is provided in refrigerant inlet line 43 to jacket 44 of said freezing chamber, which has a refrigerant outlet 46. Solid granular material is transferred from the top of freezing chamber 41 via conveyor 47 to the bottom of separation chamber 48 which is equipped with a heater 49. The melt leaves the bottom of separation chamber 48 via line 51 and flows through heat exchanger 34 in indirect heat exchange contact with the feed material flowing therethrough and leaves through line 52. The solid granular material reaching the top of separation chamber 48 is transferred via conveyor 53 to a wash chamber 54, which is provided with a heater 56. Liquid which forms by melting a portion of the frozen material in chamber 54 is removed through line 57 and may leave the system through line 58 or may be passed through line 59 to line 39 and thence to freezing chamber 44. The solid material which reaches the top of wash chamber 54 passes into a melting zone 60 from which the melt passes through line 61 into heat exchanger 36 and leaves the system through line 62, after passing through said exchanger in indirect contact with the fresh feed material flowing therethrough.

Figure 3:
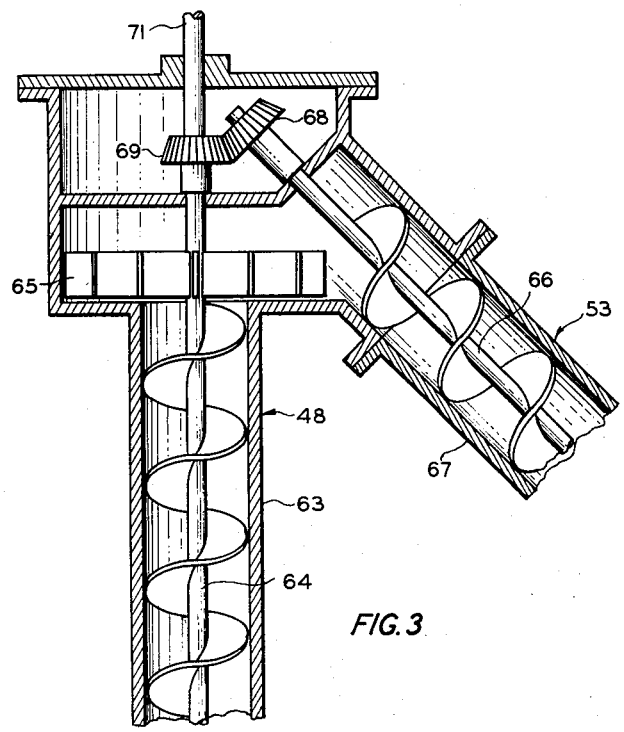
Figure 3 is a longitudinal sectional view of that portion of my apparatus with an area 3—3 of Figure 2.

In Figure 3, a cutaway portion of separation zone 48 and conveyor 53 are shown. The screw conveyor 64 cooperates with wall 63 of zone 48 to move granular material upward through chamber 48. At the top of the separation chamber is a perforated block 65 for disintegrating the solid granular material which reaches the top of the separation chamber. A screw 66 cooperates with the walls 67 of conveyor 53 to move the solid granular material downward therethrough. Screw 66 is rotated by means of a bevel gear 68 which cooperates with a similar gear 69 on shaft 71 of conveyor screw 64. Conveyor 64 is rotated by means of a motor or other similar device not here shown.

Figure 4:
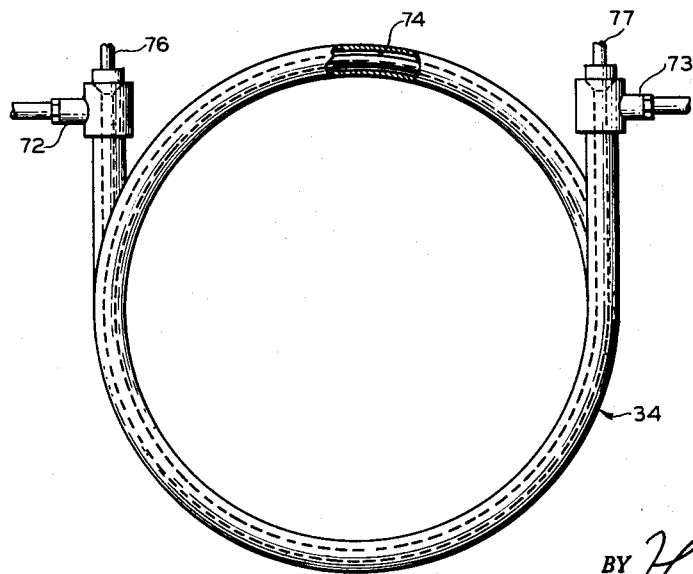
Figure 4 is a sectional view of the intercoolers shown in Figure 2.

In Figure 4, feed inlet 72 and outlet 73 allow feed liquid to be introduced into and removed from chamber 74 of heat exchanger 34. The coolant is introduced into said exchanger at inlet 76 and is removed at outlet 77. If desired, the inlet and outlet can be reversed to provide for countercurrent flow of refrigerant and the liquid being cooled.

In the preparation of pure materials, such as pure hydrocarbons, from impure mixtures, it is ordinarily preferable to take advantage of differences in boiling points and separate the desired component by distillation. However, it is not always possible to make complete separations by distillation, even if the difference in boiling points is considerable. Certain compounds form azeotropes or constant-boiling mixtures with certain others. Even if there is no azeotropic formation, it is practically impossible to effect complete separation if the difference in boiling points of the components of the mixture is only a few degrees.

My invention is particularly valuable in resolving mixtures of compounds into their components or in preparing a pure compound from an impure one when there is no solid-solution formed. This means that my invention can be used in the majority of separations, since the number of solid-solution-forming systems is small in comparison with the number of eutectic-forming systems.

Except as specifically indicated, the discussion of my invention hereafter will be limited to its operation in the separation of eutectic-forming mixtures. When such a mixture is to be separated by crystallization, that component which is present in excess of the eutectic ratio, i. e., the saturating component, will crystallize first when the liquid mixture is cooled. If the entire mixture is frozen and the temperature is gradually raised, the liquid that forms will have a composition corresponding to the eutectic ratio until all of the saturated component has been melted. The operation of my invention depends upon this fact.

My invention will be more clearly understood from the following discussion of its operation in connection with the apparatus shown in Figure 1. The mixture to be separated enters the system as a liquid through feed line 6 and is divided into two streams, one of which enters each of the parallel intercoolers, 9 and 11, where the stream is cooled preferably to a temperature just above the point at which crystallization begins. The cooled streams are combined and introduced into one end of freezing chamber 21. Sufficient heat is abstracted from said freezing chamber by any convenient means to solidify all of the material to be separated. This material is moved from the inlet end to an outlet adjacent the opposite end. A convenient method for accomplishing this is a screw conveyor which will move the solid material through the chamber and at the same time will keep the mass broken up or granulated so it can be easily transferred through the system.

The solid granular material passes from freezing chamber 21 into a separation chamber 23 through connection 22. The transfer of material through this connection may be effected by gravity movement or by a positive means, such as a conveyor. As the solid granular material is moved through the separation chamber from the inlet end, heat is added to melt a portion of the solid material. Any convenient means for adding heat may be used. For instance, an electrical heater, a heating jacket, or atmospheric heating may be employed. Sufficient heat is added to melt a fraction of the solid material corresponding to the total amount of eutectic present. Since all chambers in this apparatus are maintained completely full, the movement of crystals in one direction through the separation chamber displaces liquid in the opposite direction. By this countercurrent movement, the liquid and crystals more closely approach state equilibrium. The solid material that moves through the separation chamber to the opposite end corresponds to pure saturating component with a small amount of the eutectic liquid occluded as impurity. This substantially pure solid is removed through an outlet 24 adjacent the end of the separation chamber and is transferred to a wash chamber 26. The displaced eutectic liquid is removed from the separation chamber at a point adjacent the inlet end and is passed through one of the parallel coolers in indirect heat exchange contact with one stream of the liquid feed.

The washing in chamber 26 is similar to the operation in separation chamber 23 in that the solid granular material is introduced into one end of the wash chamber and is moved toward the opposite end. Heat is added to the material in the wash chamber to melt an additional portion of the solid granular material. This liquid is displaced toward the inlet end of said wash chamber and thereby washes the solid granular material over which it passes. The displaced liquid is removed from the wash chamber through line 27, which is shown as joining line 19, for returning the liquid to freezing chamber 21. However, it is not necessary that this liquid be returned to chamber 21, but it may be removed from the system. Near the product outlet end of the wash chamber, the entire mass of solid granular material is melted. The amount of product removed through line 14 is controlled so that at least a portion of the liquid is displaced toward the inlet end and is removed from this chamber through line 27. The melted product is passed through line 14 through the second of the parallel coolers in countercurrent contact with one stream of liquid feed. In this apparatus, the purified product is removed through line 16.

The operation of the apparatus shown in Figure 2 is similar in principle to that of Figure 1. However, the freezing, separation, and wash chambers are vertically positioned and the walls are preferably cylindrical. The liquid outlet of the separation chamber is lower than the upper outlet of the freezing chamber so that the melt formed in the separation zone will not flow into the freezing chamber. The wash chamber is similarly positioned with respect to the separation chamber. The solid granular material is moved upward through these vertical chambers by means of screw conveyors and the transfer from one chamber to the next succeeding one is accomplished by means of screw conveyors. Instead of using a single screw as shown in the drawings, I can use a pair of screws in each vertical chamber. These screws are rotated in opposite directions and cooperate to move the solid granular material upward. This type of conveyor is more efficient, but its operation is more complicated.

By using the vertical chambers, the liquid flows downward by gravity and contacts the upwardly-moving solid. This results in more efficient operation in that the approach toward equilibrium between the solid and the liquid is closer.

In this apparatus, the feed stream is split and passed through a pair of coolers before it enters the freezing chamber. The efficiency of such a process is, of course, obvious. As the liquid flows upward through the freezing chamber 41, heat is abstracted by means of a cooling jacket 44 so that the entire mass is frozen before it reaches the top. The screw conveyor keeps the frozen material removed from the walls of the vessel and keeps it in a finely divided or granular state.

The frozen granular material is introduced into the bottom portion of separation chamber 46 and is moved upward therethrough. By means of a heater 49, a sufficient quantity of heat is added to the separation chamber to melt a portion of the solid corresponding to the total amount of eutectic present. This melt flows downward to outlet line 51 in contact with the upwardly moving solid so that equilibrium between the solid and the liquid is substantially complete. The liquid leaving the separation chamber through outlet 51 is substantially pure eutectic and the solid which leaves the top of said separation chamber for transfer to the wash chamber 54 is the saturating component of the feed in a substantially pure state except for a small amount of occluded liquid.

In the operation of my apparatus and process, I prefer to withdraw the liquid from the separation and wash chambers without allowing this liquid to accumulate in these vessels. This means that at the top of each chamber, the liquid has been completely drained from the solid granular material.

The substantially pure material is removed from the top of the wash chamber as a granular solid and is transferred to a separate melting section 60 where sufficient heat is added to melt the solid and from which the melt so formed is drained. If desired, all or a portion of the wash liquid leaving the wash chamber through outlet 57 may be returned to the freezing chamber 41 via bypass 59.

If my invention is to be used in the resolution of solid solutions, the separation and wash chambers can be combined into one long vessel. However, since most systems are eutectic-forming, the present type of apparatus is preferred.

The following description of the operation of my invention with respect to a specific separation will more clearly illustrate the operation of my invention. Cis-trans butene-2 mixtures which are extremely difficult to separate by other means may be readily separated in my apparatus. The eutectic for this combination is approximately 15% trans. Accordingly, a feed which contains 0.05 mol fraction trans as impurity will form approximately 0.33 mole eutectic per original mole of feed. At 100% efficiency of operation, the yield of cis-butene would be 0.67 mole per mole of original feed.

In actual operation, the streams leaving the intercoolers should be at a temperature of about $-150°$ F. This cooled stream is then passed into the freezing section which is cooled to solidify the entire feed entering the system. In the separation chamber, approximately 33 mol per cent of the total mass is melted and removed from the liquid outlet at the bottom. By passing the solid upward and causing the liquid melt to flow downward through the chamber, the liquid leaving at the bottom comprises substantially pure eutectic while the solid leaving at the top comprises substantially pure cis-butene-2, except for a small amount of occluded eutectic liquid. It is the purpose of the wash step to remove this occluded eutectic liquid by melting an additional portion of the solid. Only a small amount of the solid needs to be melted in this step and the efficiency of the separation is not substantially reduced thereby. As the solid moves upward through the wash chamber, the occluded eutectic liquid is displaced from the solid granular material by the formation of additional liquid due to the melting. The liquid that flows from the bottom of this chamber through outlet 57 comprises a mixture of the two isomers which mixture is saturated with respect to the cis isomer.

The exact amount of melting that should be carried out in the separation zone is determined by the per cent of impurity present. The amount of melting in the wash chamber should be sufficient to displace all of the occluded liquid impurity and can best be determined by the freezing point of the solid material reaching the top of the chamber. The portion melted should be only that amount that is required to produce a product having a satisfactory purity. Experience with various systems will indicate the optimum amount to be melted in the wash section for each system.

My invention is applicable to any separation wherein the components are not decomposed by the melting. The example is given for illustration only and it is not intended to limit my invention thereto. The scope of my invention is limited only by the following claims.

Having described my invention, I claim:

1. A fractional fusion apparatus which comprises, in combination, a separation zone comprising a walled, elongated chamber, a screw conveyor in said chamber and cooperating therewith to move a solid granular material therethrough when rotated, a heater in heat exchange relation with said separation zone, a freezing chamber separate from said separation zone, means for transferring solid granular material from said freezing zone to said separation zone, an outlet in one end of said separation zone for removing a purified fraction and a liquid outlet in the opposite end of said separation zone for removing an impure liquid fraction.

2. A fractional fusion apparatus which comprises, in combination, a separation zone comprising a walled, elongated chamber, a heater in heat exchange with said separation zone, a screw conveyor in said chamber and cooperating therewith to move a solid granular material therethrough when rotated, a freezing chamber separate from said separation zone, means for extracting heat from said freezing chamber, means for transferring solid granular material from said freezing chamber to said separation zone, an outlet in one end of said separation zone for removing a purified fraction and a liquid outlet in the opposite end of said separation zone for removing an impure liquid fraction.

3. A fractional fusion apparatus which comprises, in combination, a separation zone comprising a welled, elongated chamber, a heater in heat exchange with said separation zone, a screw conveyor in said chamber and cooperating therewith to move a solid granular material therethrough when rotated, a freezing chamber, means for extracting heat from said freezing chamber, a feed line leading to said freezing chamber, means for transferring solid granular material from said freezing chamber to said separation zone, an outlet in one end of said separation zone for removing a purified fraction and a liquid outlet in the opposite end of said separation zone for removing an impure fraction, a heat exchanger in said feed line upstream of said freezing chamber for cooling the liquid feed by indirect contact with said impure fraction.

4. A fractional fusion apparatus comprising, in combination, a separation zone comprising a vertical-walled cylindrical chamber, a vertical screw conveyor within said chamber and cooperating therewith to move a solid granular material upwardly when rotated, means for rotating said screw conveyor so as to lift granular material contained therein, a freezing chamber, means for transferring solid granular material from said freezing chamber to the bottom of said separation zone, means for adding heat to the upper portion of said separation zone, a washing chamber connected to the upper portion of the separation zone, a liquid outlet in the bottom of said separation zone for removing an impure liquid fraction, and a liquid outlet in the upper portion of said washing chamber for removing a purified liquid fraction.

5. A fractional fusion apparatus comprising, in combination, a vertical-walled cylindrical separation chamber, a heater in heat exchange with said separation chamber, a vertical screw conveyor within said chamber and cooperating therewith to move a solid granular material upwardly when rotated; a freezing chamber separate from said separation chamber and comprising a jacketed, vertical-walled cylindrical chamber, a vertical screw conveyor within said freezing chamber and cooperating therewith to remove solid granular material from the walls of said chamber and move said material upwardly through said chamber; means to transfer said solid granular material from the top of said freezing chamber to the bottom of said separation chamber, an outlet at the top of said separation chamber for removing a purified fraction and a liquid outlet in the bottom of said separation chamber for removing an impure liquid fraction.

6. A fractional fusion apparatus comprising, in combination, a separation zone comprising a vertical-walled cylindrical chamber, a heater in heat exchange with said separation chamber, a vertical screw conveyor within said chamber and cooperating therewith to move a solid granular material upwardly when rotated; a freezing chamber separate from said separation chamber and comprising a jacketed, vertical-walled cylindrical chamber, a vertical screw conveyor within said freezing chamber and cooperating therewith to remove solid granular material from the walls of said chamber and move said material upwardly through said chamber when rotated; means to transfer said solid granular material from said freezing chamber to said separation chamber, an outlet at the top of said separation chamber for removing a purified fraction and a liquid outlet in the bottom of said separation chamber for removing an impure liquid fraction.

7. A fractional fusion apparatus comprising, in combination, a separation zone comprising a vertical-walled cylindrical chamber, means for adding heat to said separation chamber, a vertical screw conveyor within said chamber and cooperating therewith to move a solid granular material upwardly when rotated; a freezing chamber comprising a jacketed, vertical-walled cylindrical chamber, a feed inlet line into said freezing chamber, a vertical screw conveyor within said freezing chamber and cooperating therewith to remove solid granular material from the walls of said chamber and move said material upwardly through said chamber when rotated; means to transfer said solid granular material from said freezing chamber to said separation chamber, an outlet at the top of said separation chamber for removing a purified solid fraction and a liquid outlet in the bottom of said separation chamber for removing an impure wash liquid fraction; a wash chamber comprising a jacketed, vertical-walled cylindrical chamber, means for adding heat to said wash chamber, a vertical screw conveyor within said wash chamber and cooperating therewith to move a solid granular material upwardly when rotated; means to transfer said purified solid fraction from said separation chamber to said wash chamber, an outlet at the top of said wash chamber for removing a purified fraction and a liquid outlet in the bottom of said wash chamber for removing an impure liquid fraction; and means for returning said impure wash liquid from the bottom of said wash chamber to said inlet line to said freezing chamber.

8. A fractional fusion apparatus which comprises in combination a first heat exchanger and a second heat exchanger in parallel therewith, a feed line leading to each of said exchangers, a freezing chamber comprising an elongated enclosed vessel, a feed conduit leading from each of said heat exchangers to one end of said freezing chamber, an outlet in the opposite end of said chamber; a separation chamber comprising an elongated, closed container, a conduit connection between the outlet of said freezing chamber and said separation chamber, a liquid outlet in one end of said separation chamber adjacent the feed inlet for removing an impure fraction, a conduit connection between said liquid outlet and the refrigerant inlet of said first heat exchanger, a product outlet in the top of said separation chamber for removing a partially purified solid granular material, means for moving a solid granular material from the feed inlet of said separation zone to the outlet for said granular material; a wash chamber comprising an elongated closed vessel, a feed inlet in one end of said vessel, a conduit connection between said last-named feed inlet and the granular material outlet in said separation chamber, means for moving the granular material from the inlet end of said wash chamber to the opposite end, a liquid outlet in said wash chamber adjacent said feed inlet for removing an impure wash liquid, a conduit connecting said liquid outlet with the material feed line upstream of said freezing chamber, means for adding heat to said wash chamber, a product outlet in the end of said wash chamber opposite the feed inlet end for removing a purified fraction, and a conduit leading from said product outlet of said wash chamber to the refrigerant inlet of said second heat exchanger.

9. A fractional fusion apparatus comprising, in combination, an upright separation chamber; a solid material conveyor within said chamber and adapted to move solid material upwardly within said chamber; drive means connected to said conveyor; an upright freezing chamber connected at its upper end portion to the lower end portion of said separation chamber; a heater in heat exchange relationship with the upper portion of said separation chamber; an outlet in the upper portion of the separation chamber for removing a purified fraction; and a liquid outlet in the lower portion of the separation chamber for removing an impure fraction.

10. A fractional fusion apparatus comprising, in combination, a freezing chamber; a feed inlet into one end of said freezing chamber; a solid material conveyor within said chamber; a separation chamber; a heater in heat exchange relationship with said separation chamber; a first conduit connecting the end of said freezing chamber opposite the feed inlet to one end of the separation chamber; a liquid outlet in the end of said separation chamber containing said first conduit for removing an impure fraction; an outlet in the opposite end portion of the separation chamber for removing a purified fraction; a solid material conveyor in said separation chamber and adapted to move solid materials toward the pure fraction outlet end; and drive means connected to said conveyors.

FRANK P. VANCE, Jr.

REFERENCES CITED

The following references are of record in the file of this patent:

UNITED STATES PATENTS

| Number | Name | Date |
|---|---|---|
| 1,738,275 | Baker | Dec. 3, 1929 |
| 2,200,982 | Dedlow | May 14, 1940 |
| 2,540,977 | Arnold | Feb. 6, 1951 |